United States Patent [19]

Clench

[11] Patent Number: 5,056,382
[45] Date of Patent: Oct. 15, 1991

[54] MATRIX DIAMOND DRAG BIT WITH PCD CYLINDRICAL CUTTERS

[75] Inventor: Mark Clench, Spring, Tex.

[73] Assignee: Smith International, Inc., Houston, Tex.

[21] Appl. No.: 630,682

[22] Filed: Dec. 20, 1990

[51] Int. Cl.$^5$ ............................................. B21K 5/02
[52] U.S. Cl. ............................ 76/108.2; 76/DIG. 12
[58] Field of Search ............... 76/108.2, 108.4, 108.1, 76/DIG. 12, 101.1

[56] References Cited

U.S. PATENT DOCUMENTS

| | | | |
|---|---|---|---|
| 4,453,605 | 6/1984 | Short | 76/DIG. 12 |
| 4,499,795 | 2/1985 | Radtke | 76/DIG. 12 |
| 4,858,706 | 8/1989 | Lebourg | 76/DIG. 12 |

*Primary Examiner*—Roscoe V. Parker
*Attorney, Agent, or Firm*—Robert G. Upton

[57] ABSTRACT

A drag bit mold fabricated from high temperature resisting material is machined to accept cylindrically shaped polycrystalline diamond cutters (PCD) having tungsten carbide bodies. Each of the multiple PCD matrix pockets in the mold is formed by two independent non-parallel end mill passes. The first end mill cut defines the PCD cutter position in the cutting face of the matrix diamond drag bit. The second end mill cut superimposed over the first end mill pocket creates a surrounding pocket which fills with powder metallurgy matrix material to provide support for the cylindrical cutter.

8 Claims, 3 Drawing Sheets

MATRIX DIAMOND DRAG BIT WITH PCD CYLINDRICAL CUTTERS

BACKGROUND OF THE INVENTION

1. Field of the Invention

This invention relates to diamond drag bits for drilling earthen formations having polycrystalline diamond inserts imbedded in the cutting face of the bit.

More particularly, this invention relates to matrix type diamond drag bits fabricated by a powder metallurgy process wherein cutter pockets and relief pockets are formed in a female mold to accept and support cylindrically shaped polycrystalline diamond inserts subsequently brazed in place in the pre-formed pockets.

2. Description of the Prior Art

Typically, milled relief pockets adjacent cutter pockets formed in matrix bits are vectored parallel with the cutter pockets resulting in inadequate support for the cylindrical shaped PCD cutters.

The present invention provides a milled relief pocket adjacent the cutter pocket that is vectored at a different angle than the angle of the cutters oriented in the face of the matrix bit. The relief pocket provides maximum compression support for the base of the PCD cylindrical and increased cylindrical wall support while relieving the cutter backrack surface.

SUMMARY OF THE INVENTION

It is an object of this invention to provide additional back and side support for cylindrical type diamond inserts embedded in a matrix type drag bit.

It is another object of this invention to provide back rake clearance for each cylindrically shaped PCD insert brazed in the cutting face of a matrix drag bit while providing the foregoing back and side support for each insert.

A process of forming a matrix type diamond drag bit cutter head having a multiplicity of cylindrically shaped polycrystalline diamond inserts strategically positioned and metallurgically secured to a drag bit face is disclosed.

A female mold of heat resistant material, such as graphite is milled with a multiplicity of first cylindrically shaped insert channels or pockets. The pockets are formed in a direction of rotation of the drag bit and at an angle to an earthen formation such that a negative rake angle is established with respect to a cutting face of the cylindrically shaped polycrystalline diamond insert.

A second non-parallel channel is milled in the mold substantially axially aligned with and superimposed over the first channel but at a shallower angle and at a depth less than the depth of the first cylindrically shaped channel or pocket.

A heat resistant cylindrically shaped stud is placed into each of the first cylindrically shaped insert pockets. The mold is then filled with a matrix material in powder form into the female mold. The mold and matrix material is then heated in a furnace thereby forming the cutter head.

The heat resistant studs are then removed from the first cylindrically shaped insert pockets.

The cylindrically shaped polycrystalline diamond inserts are then metallurgically bonded into each of the first insert pockets. The inserts have additional back and side support provided by the matrix filled second channel surrounding each insert.

An advantage then of the present invention over the prior art is the ability to provide side and back support for a cylindrical PCD diamond insert thereby assuring each insert the ability to withstand compression forces under downhole drilling conditions.

Moreover, the double pocket mold design with non-parallel recesses in the mold provide each insert with back rake clearance as well as superior support thereby minimizing heat build up and insert integrity as the matrix bit works in a borehole.

DESCRIPTION OF THE PREFERRED EMBODIMENTS AND BEST MODE FOR CARRYING OUT THE INVENTION

Figure 1:
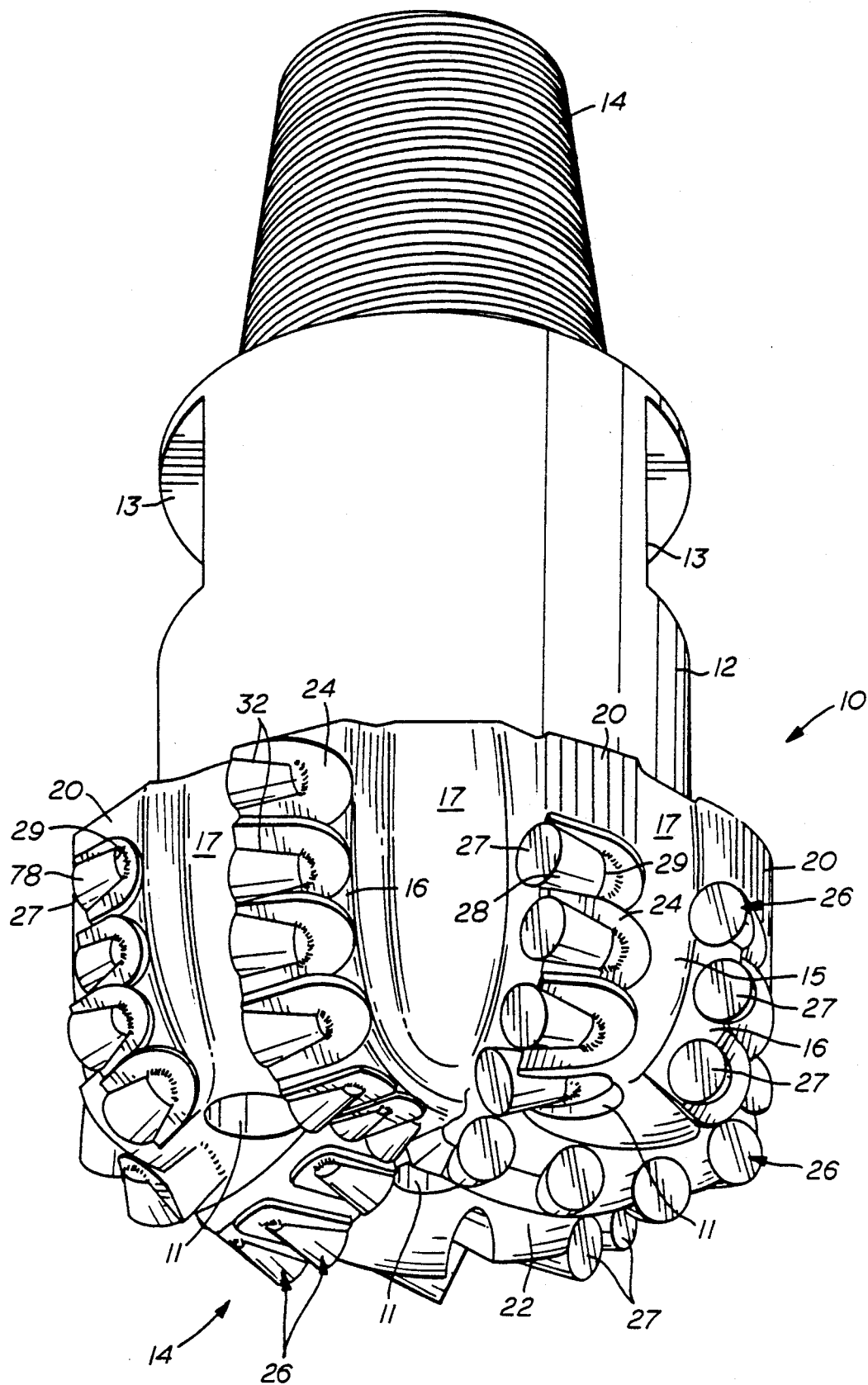
FIG. 1 is a perspective view of a matrix type diamond drag bit.

FIG. 1 is a perspective view of a matrix type diamond drag bit generally designated as 10. Drag bit 10 consists of a drag bit body 12 having oppositely opposed grooves 13 formed therein to facilitate removal of the bit from a drill string (not shown). At the upper end of body 12 is a threaded pin end 14. At the opposite end is the cutter head generally designated as 14. The cutter head is comprised of a matrix type body or head 15 that is cast in a female mold 40 (see FIGS. 2, 3 and 4). The mold generally is fabricated from, for example, a graphite material that is easily machinable and withstands extremely high heat during the casting process. Contained within ribs 16, projecting substantially longitudinally along the head 15, is a multiplicity of cylindrical type diamond inserts generally designated as 26. Each insert, for example, has a body 28 fabricated from, for example, tungsten carbide, a base end 29 and a cutting end 27. The cutting end 27 is, for example, a polycrystalline diamond sintered to the tungsten carbide body. Each of the cavities surrounding the inserts 26 is formed in the female mold 40 and is an extremely important aspect of the present invention.

One or more nozzles 11 are formed by the matrix head 15. Drilling "mud" or fluid is directed down through pin end 14 and out through the nozzles 11 during operation of the bit in a borehole. An inner cavity is formed within the bit body 12 that is open to both pin end 14 and the nozzles 11 (not shown).

Each of the protruding ribs 16 extending from the matrix body 15 has a gage bearing surface 20 that, for example, may be embedded with a natural diamond to help maintain the gage or diameter of the borehole as the bit is rotated in an earthen formation.

Figure 2:
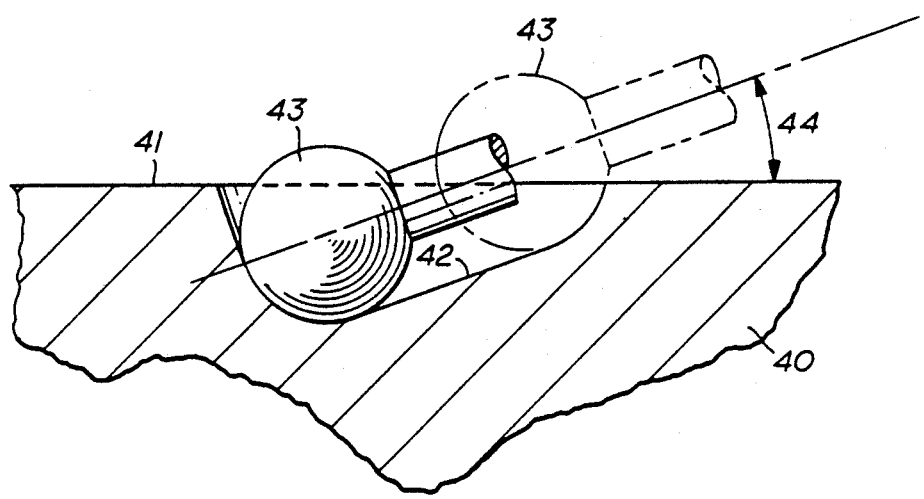
FIG. 2 is a semi-schematic partial cross section of a female mold illustrating a mill cutter pass forming a first pocket for a cylindrically shaped diamond insert in the female mold.

Turning now to FIG. 2 the partially cutaway illustration shows the female mold 40 with a groove or pocket 42 milled within the bottom 41 of the female mold 40. A ball mill 43 substantially the same diameter as the insert 26, is passed into the graphite mold bottom 40 at an angle 44 thereby forming the insert pocket 42. The angle 44 may be between 25 degrees and 15 degrees. The preferred angle is 20 degrees. The angle 44 determines the degree of negative rake angle of each cutting face of the inserts with respect to a borehole bottom. The ball mill cutter 43 passes down its axis 44 a length sufficient to form a pocket support for an insert stud body blank 49 (FIG. 4).

Figure 3:
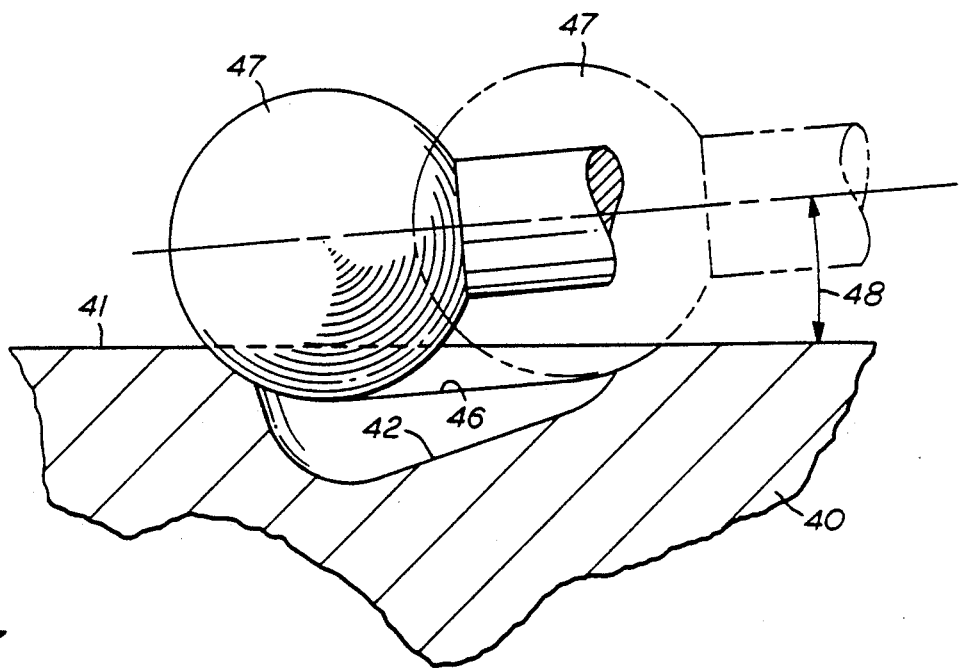
FIG. 3 is a semi-schematic partial cross section of a female mold illustrating a second mill cutter pass at a different angle than the first mill cutter pass forming a second pocket surrounding the first insert pocket in the female mold.

Referring now to FIG. 3, the graphite bottom 40 is subsequently subjected to a second ball mill pass. The ball mill 47 is superimposed over the cavity 42 formed by the first pass of the ball mill 43. The ball mill 47 is, for example, much larger in diameter and is directed along a different or shallower angle 48 than the angle 44 of the insert pocket cavity formed by ball mill 43. The angle 48 may be between 12 degrees and 3 degrees. The preferred angle is 5 degrees. The non-parallel angulation between the insert pocket 42 and the surrounding pocket 46 assures adequate insert backup support while providing insert backrack clearance 51 (see FIG. 4). The end mill 47 is passed over the insert pocket 42 forming a second shallower groove around cavity 42.

Again the angles 44 and 48 differ to provide both clearance for the cutting face 27 of the insert 26 and adequate support for the base 29 and sidewalls of body 28 of the insert 26.

Figure 4:
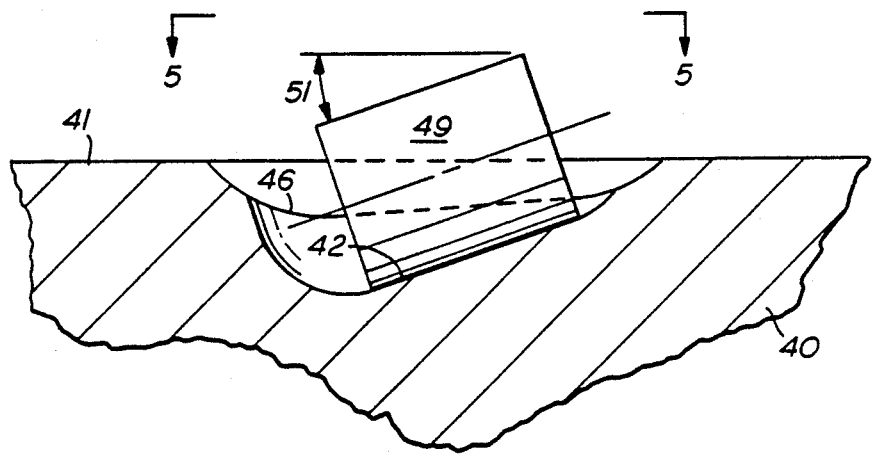
FIG. 4 is a semi-schematic partial cross section of a female mold with a heat resisting insert blank positioned in the first insert pocket.

FIG. 4 shows the completed cavities 42 and 46 (insert pocket 42 and the insert support pocket 46). A heat resisting substitute insert blank 49 is then secured within the complimentary insert pocket 42. The blank 49 is preferably glued within pocket 42.

There are a multiplicity of insert pockets 42 and their attendant insert support cavities 46 in the matrix ribs 16 protruding from the matrix body 15.

The heat resisting stud body 49 is glued into position in its insert pocket 42 prior to pouring of the matrix powder material into the female mold thus filling all of the voids surrounding the stud blank 49 prior to firing of the powdered matrix material within an oven for a predetermined length of time (not shown).

The preferred matrix material is a powder metal such as crushed tungsten carbide which may be either $W^2C$ and or Wc. The female mold 40 is typically formed of graphite but may be fabricated from other suitable refractory material. The mold is vibrated to compact the tungsten carbide material around each of the insert blanks 49 and to fill all the voids with the powdered material.

A braze material comprised of a combination selected from the group consisting of copper, nickel and zinc or tin is melted and subsequently is infiltrated through the tungsten carbide mass to form the matrix drag bit cutter head 14 (not shown). This process is well known in the prior art.

Figure 5:
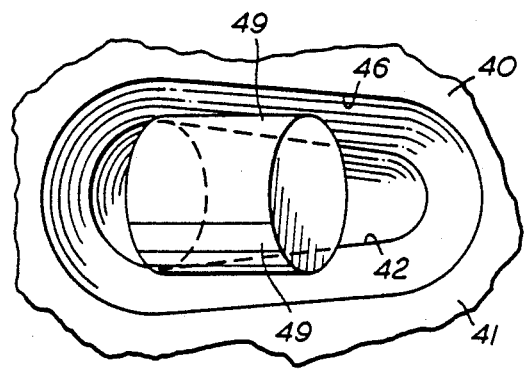
FIG. 5 taken through 5—5 of FIG. 4 is a view looking down into the female mold at the heat resisting insert blank in position in the first insert pocket.

FIG. 5 is a view looking down on just one of the substitute insert blanks 49 positioned within the multiplicity of cavities 42 and 46 formed in the female mold cavity prior to pouring of the matrix material and firing of the cutter head 14 in a furnace.

Figure 6:
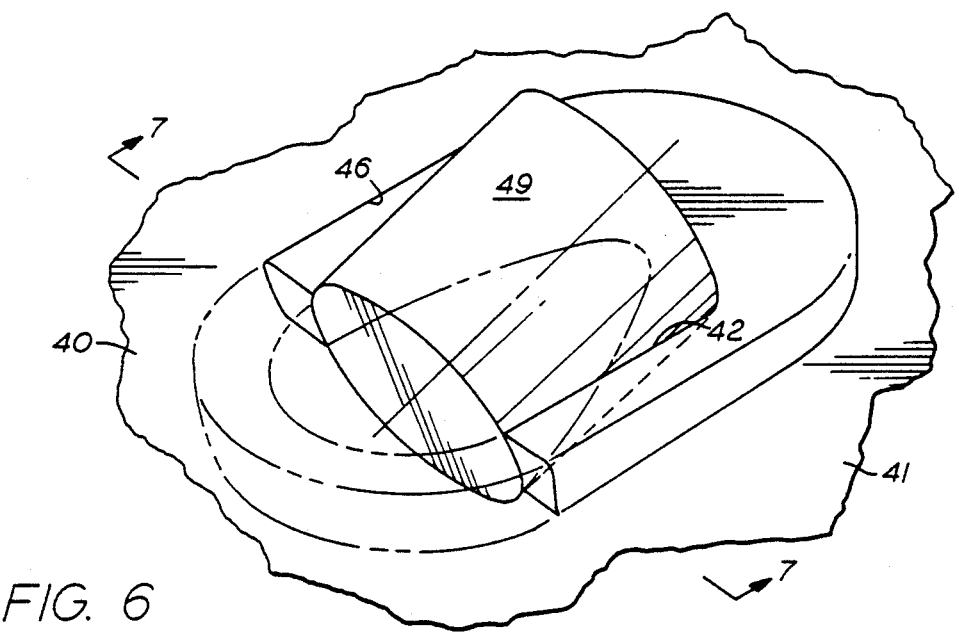
FIG. 6 is a partially cut away perspective view of the bottom of the female mold with the insert blank in place illustrating the second pocket surrounding the insert blank.

FIG. 6 is a perspective view of the insert blank 49 positioned within cavity 42 of the mold 40, a portion of the insert stud protrudes up from the mold face 41 of the female mold 40. The area 46 formed by the second mill pass provides a cavity that is filled with matrix material which provides tremendous support at the base 29 of the insert 26 and also the sidewalls of the tungsten carbide insert body 28 of each of the inserts 26.

Figure 7:
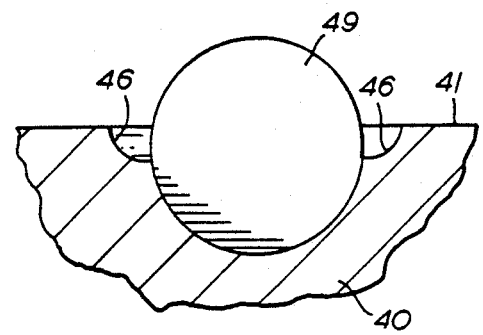
FIG. 7 is a cross sectional view taken through 7—7 of FIG. 6 illustrating the face of the insert blank and the surrounding second pocket.

FIG. 7 is a view looking directly into the face of the substitute insert 49 showing the sidewall cavities 46 surrounding the insert, the depth of the cavity 46 determines the amount of side support for each of the inserts 26.

Figure 8:
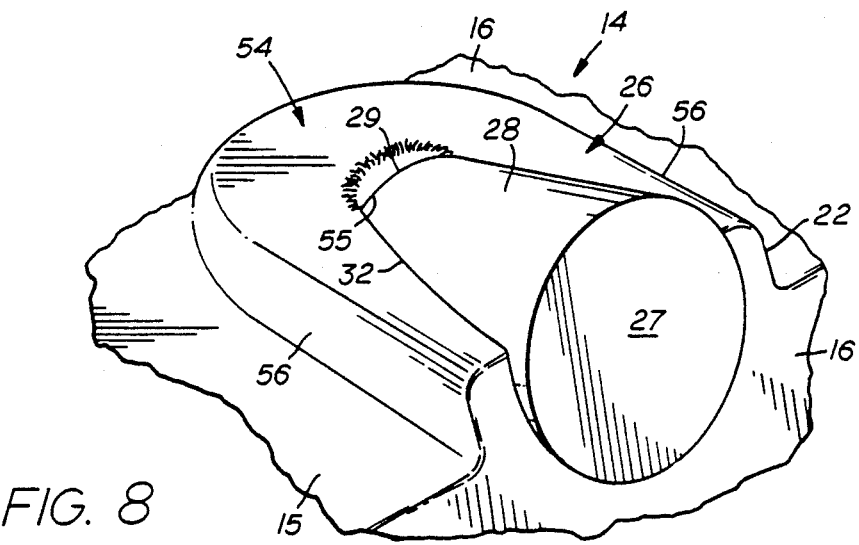
FIG. 8 is a partially broken away perspective view of one of the polycrystalline diamond inserts brazed into the first insert pocket, the raised surrounding matrix material filling in the second, superimposed pocket to backup and strengthen the multiple inserts secured within the drag bit cutter head.

Finally, with respect to FIG. 8, a view is taken of one of the polycrystalline inserts 26 brazed into pocket 42 the completed cutter head 14 after the matrix material 15 is fired.

After the firing of the mold in a furnace following the processes just described, the tungsten carbide cutter head 14 is removed from the female mold. Each of the dummy inserts 49 are then removed from cavity 42 leaving a insert shaped cavity for insertion of a cylindrically shaped polycrystalline diamond stud into the pocket formed by the stud body 49. The inserts 26 are then brazed into position at joint 32 thus firmly securing the body 28 of each of the inserts 26 in the pockets 42 and 46 formed in the female mold through the use of the aforementioned process of two non-parallel mill passes. The result being a raised portion 56 in the cutter head 14 that comes up the sidewall of the tungsten carbide body 28 and almost completely surrounds the end 29 of the tungsten carbide body 28 of diamond insert 26. The raised portion 56 thus provides very strong resistance to compressive forces while firmly securing the sides of the insert body 28 during operation of the drag bit in a borehole. As can be seen, each of the multiplicity of inserts is angled with respect to a borehole bottom such that a negative rake angle is established. This negative rake angle of course is established by the first mill pass of ball mill 43 in the female mold 40.

It would be obvious to create any angle desired whether it be a negative rake angle, 0 rake angle or positive rake angle without departing from the scope of this invention.

Fluid passage grooves 17 are formed between ribs 15 and cutter head 14 to provide passage of detritus up through the grooves 17 in the bit to the rig platform (not shown).

Typically, after the tungsten carbide cutter head 14 is formed in the female mold it then is brazed to a steel body 12 completing the assembly of the matrix bit 10 as shown in FIG. 1 (not shown).

The body 12 is easily brazed to the head 14 after each of the tungsten carbide polycrystalline faced diamond inserts are brazed into their respective insert cavities 42 thus completing the construction of the matrix type drag bit 10.

The braze material used to braze the insert bodies 28 into the respective cavities 42 is a combination of copper, nickel and zinc or tin. The temperature of the brazing process of course is such that it will not destroy the polycrystalline diamond faces of the diamond insert blanks 26 during their brazing process.

It will of course be realized that various modifications can be made in the design and operation of the present invention without departing from the spirit thereof. Thus while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A process of forming a matrix type diamond drag bit cutter head having a multiplicity of cylindrically shaped polycrystalline diamond inserts strategically positioned and metallurgically secured to a drag bit face comprising the steps of:

forming a female mold of heat resisting material, milling a multiplicity of first cylindrically shaped insert channels in said mold, said channels being formed in a direction of rotation of said drag bit and at an angle to an earthen formation such that a negative rake angle is established with respect to a cutting face of said cylindrically shaped polycrystalline diamond insert, milling a second non-parallel channel substantially axially aligned with and superimposed over said first channel but at a shallower angle and at a depth less than the depth of said first cylindrically shaped channel, said second channel provides a pocket surrounding said first channel thus providing a matrix filled support for said cylindrically shaped insert, securing a heat resistant cylindrically shaped stud in each of said first cylindrically shaped insert channels, inserting said matrix material in powder form in said female mold, heating said matrix material in said mold in a furnace thereby forming said cutter head, removing said heat resistant studs from said first cylindrically shaped insert channels; and bonding metallurgically, said cylindrically shaped polycrystalline diamond inserts into each of said first insert channels, said inserts having additional support provided by the matrix filled second channel at a different angle and a lesser depth surrounding said insert.

2. The process as set forth in claim 1 wherein the angle of said first channel is between 25 degrees and 15 degrees.

3. The process as set forth in claim 2 wherein the angle of said first channel is 20 degrees.

4. The process as set forth in claim 1 wherein the angle of said second channel superimposed over said first insert channel is between 12 degrees and 3 degrees.

5. The process as set forth in claim 4 wherein the angle of the second channel is 5 degrees.

6. The process as set forth in claim 1 wherein said heat resistant cylindrically shaped insert is secured into said first channel by gluing.

7. The process as set forth in claim 1 wherein said polycrystalline diamond inserts are metallurgically bonded into said insert channel by brazing.

8. The process as set forth in claim 1 wherein said first and second non-parallel channels are formed by a ball end mill cutter.

* * * * *